(12) United States Patent
Fritz et al.

(10) Patent No.: US 7,999,966 B2
(45) Date of Patent: Aug. 16, 2011

(54) COLOR CONTENT DETECTION (75) Inventors: Terry M. Fritz, Vancouver, WA (US); David W. Kinkley, Vancouver, WA (US); Kevin A. Owen, Meridian, ID (US); Michael J. Pervere, Vancouver, WA (US); Tamra J. Fife, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1015 days.

(21) Appl. No.: 11/787,792

(22) Filed: Apr. 18, 2007

(65) Prior Publication Data
US 2008/0260281 A1 Oct. 23, 2008

(51) Int. Cl.
*G06K 15/00* (2006.01)
*G06K 9/00* (2006.01)
*G06K 9/34* (2006.01)
*G06F 15/00* (2006.01)
*G06F 17/00* (2006.01)
*H04N 1/46* (2006.01)

(52) U.S. Cl. ........ 358/1.18; 358/1.6; 358/530; 705/400; 382/165; 382/173

(58) Field of Classification Search .................. None
See application file for complete search history.

(56) References Cited

U.S. PATENT DOCUMENTS

| 3,911,254 | A | 10/1975 | Leibrecht et al. | |
|---|---|---|---|---|
| 6,240,203 | B1 * | 5/2001 | Kawano et al. | 382/164 |
| 6,574,443 | B1 | 6/2003 | Butikofer et al. | |
| 7,103,581 | B1 | 9/2006 | Suen et al. | |
| 2001/0024584 | A1 * | 9/2001 | Kurosawa | 400/76 |
| 2002/0165833 | A1 | 11/2002 | Minowa et al. | |
| 2003/0020951 | A1 * | 1/2003 | Minowa et al. | 358/1.15 |
| 2004/0184106 | A1 | 9/2004 | Ferlitsch | |
| 2005/0007618 | A1 * | 1/2005 | Thomason | 358/1.14 |
| 2005/0007621 | A1 | 1/2005 | Barry et al. | |

FOREIGN PATENT DOCUMENTS

JP 404294379 A 10/1992
JP 408009170 A 1/1996

* cited by examiner

*Primary Examiner* — Twyler L Haskins
*Assistant Examiner* — Barbara D Reinier (57) ABSTRACT

Embodiments including detection of color content in an image are disclosed.

20 Claims, 8 Drawing Sheets

USAGE TOTALS SUMMARY: PRINTED: 95,200.0 (405)  WEIGHTED FOR BILLING: 292,012.0 (408)

410—COLOR QUALITY: MONOCHROME

| 412—PAGE SIZE | SIMPLEX (420) | UNITS (421) | DUPLEX (422) | UNITS (423) | TOTAL (425) | 1X WEIGHTED (426) |
|---|---|---|---|---|---|---|
| 414—LETTER/A4 | 1002 | 1.0 | 428 | 2.0 | 1858.0 | |
| 416—A3 | 46 | 2.0 | 21 | 4.0 | 176.0 | |
| 418—TOTAL CATEGORY USAGE | | | | | 2,034.0 (427) | 2,034.0 (429) |

430—COLOR QUALITY: GENERAL OFFICE - ACCENT COLOR

| PAGE SIZE | SIMPLEX | UNITS | DUPLEX | UNITS | TOTAL | 2X WEIGHTED |
|---|---|---|---|---|---|---|
| LETTER/A4 | 12,341 | 1.0 | 9,823 | 2.0 | 31,987.0 | |
| A3 | 1,654 | 2.0 | 1,512 | 4.0 | 9,356.0 | |
| TOTAL CATEGORY USAGE | | | | | 41,343.0 | 82,686.0 |

440—COLOR QUALITY: GENERAL OFFICE - FULL COLOR

| PAGE SIZE | SIMPLEX | UNITS | DUPLEX | UNITS | TOTAL | 3X WEIGHTED |
|---|---|---|---|---|---|---|
| LETTER/A4 | 934 | 1.0 | 475 | 2.0 | 1,884.0 | |
| A3 | 654 | 2.0 | 512 | 4.0 | 3,356.0 | |
| TOTAL CATEGORY USAGE | | | | | 5,240.0 | 15,720.0 |

450—COLOR QUALITY: PROFESSIONAL - ACCENT COLOR

| PAGE SIZE | SIMPLEX | UNITS | DUPLEX | UNITS | TOTAL | 4X WEIGHTED |
|---|---|---|---|---|---|---|
| LETTER/A4 | 12,341 | 1.0 | 9,823 | 2.0 | 31,987.0 | |
| A3 | 1,654 | 2.0 | 1,512 | 4.0 | 9,356.0 | |
| TOTAL CATEGORY USAGE | | | | | 41,343.0 | 165,372.0 |

460—COLOR QUALITY: PROFESSIONAL - FULL COLOR

| PAGE SIZE | SIMPLEX | UNITS | DUPLEX | UNITS | TOTAL | 5X WEIGHTED |
|---|---|---|---|---|---|---|
| LETTER/A4 | 934 | 1.0 | 475 | 2.0 | 1,884.0 | |
| A3 | 654 | 2.0 | 512 | 4.0 | 3,356.0 | |
| TOTAL CATEGORY USAGE | | | | | 5,240.0 | 26,200.0 |
| 470—GRAND TOTAL CATEGORY USAGE | | | | | 95,200.0 (474) | 292,012.0 (478) |

COLOR CONTENT DETECTION

Classifying a printed and/or copied image based upon color content, such as a page of a document having text mixed with incidental colored elements (e.g., a blue web address or a small company logo), can be limiting. On one hand, a user wanting to be charged a fee for a monochrome image can lose the color contents in a rendered image.

On the other hand, if a user wants the rendered image to display colored elements, pages of the image can be saved and printed as a "full color" document, even though the color content is incidental to the total image content. Consequently, the user can be charged a per page fee for full color that is several times the per page fee charged for a monochrome image regardless of a low color content level. In an environment where cost control is a consideration, a manager of a copier/printer can be presented with a dilemma regarding the importance of preserving a colored image element that can increase the per page fee several times.

Some copier/printer devices can detect color content by making a binary decision based on whether there is enough content on a page to be considered color. A threshold level for such a decision can be set to allow a low color content level to be classified as "full color" in order to retain color in a rendered image.

However, for pages of an image with color content greater than zero but less than the threshold (e.g., several pixels or text characters) color content can be lost, although that may not be what the user expected. When the threshold is set low enough to classify several pixels or text characters as full color, scanner noise can result in falsely classifying a rendered image as full color even though the original was monochrome. As such, a user of copier/printer devices can be charged an amount for copying and/or printing an image that does not correlate with an intended outcome due to the binary nature of color content detection.

DETAILED DESCRIPTION

Various embodiments of the present disclosure can provide more categories to which image data can be assigned than the two monochrome and full color categories. At least one additional category to which image data can, in various embodiments, be assigned can be referred to as an "incidental" or "accent" color category based upon a color content level determined to be between the levels classified as the monochrome and full color categories. In various embodiments, the color content level(s) can be detected and quantified by color content detection logic.

By classifying image content (e.g., for each page of the image) into categories corresponding to different color content levels, the present disclosure can, in various embodiments, enable assigning a different cost for each category based upon the quantification of the color content. As such, a cost for saving and/or printing rendered image data can reflect fees intermediate between the fees charged for monochrome and full color images when the image, or pages thereof, is assigned to an accent color category. Hence, a manager can be provided with costs for copying and/or printing that more closely reflect the color content of the original image than may be incurred using copier/printer devices that make a binary decision based on whether there is enough content to be considered color.

Accordingly, among various embodiments of the present disclosure, image processing can be performed by receiving image data from a source, where the image data includes a color content, and detecting and quantifying the color content of the image data. The image data can be assigned to at least one category based upon the quantification of the color content, where the at least one category is selected from a group of categories that include, in various embodiments, a monochrome category, a full color category, and a number of categories between the monochrome category and the full color category. In some embodiments, the at least one category to which the image data is assigned, including the categories between the monochrome category and the full color category, can be used in determining a cost for storing the rendered image data and/or printing the rendered image data on a print medium.

Figure 1A:
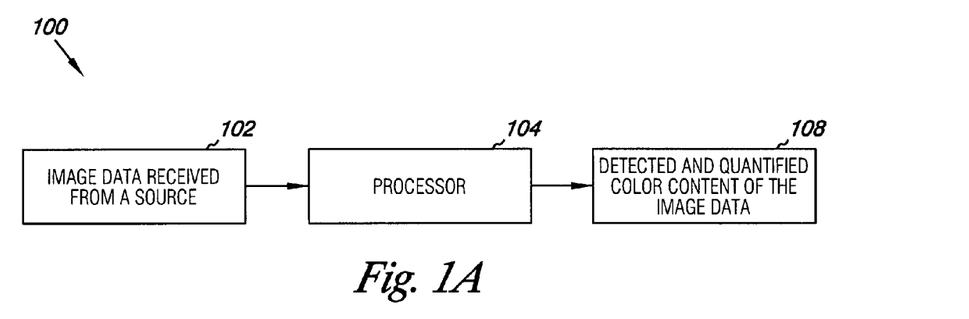
FIG. 1A illustrates an example of an image processing apparatus detecting and quantifying source image data according to embodiments of the present disclosure.

FIG. 1A illustrates an example of an image processing apparatus detecting and quantifying source image data according to embodiments of the present disclosure. FIG. 1A illustrates an image processing apparatus 100.

The image processing apparatus 100 can include receiving source image data from a source 102, and a processor 104, which can perform or assist in performing, detection and quantification of color content of the image data 108. In various embodiments, image data can be received from a variety of sources that can include a scanning device, a print driver (e.g., sending a document from a host device such as a computer), a facsimile (fax) machine, and various digital send devices, among others.

Color content detection logic utilized either by or in association with the processor 104 can perform a number of techniques described in further detail below to quantify the color content of received image data. The color content of received image data can range from no color other than monochrome (e.g., in a text document received from a print driver), through accent color (e.g., in a primarily text document that includes a blue web address or a small company logo), to full color (e.g., in a representation of an outdoor scene).

The processing apparatus 104 of FIG. 1 can have a memory coupled thereto, where instructions can be stored for execution by the processor 104. In various embodiments, the instructions executed to receive the source image data 102 can include instructions to execute receiving and processing source image data before or after the source image data has been rendered (e.g., by rasterizing and pixelati). The processor 104 can, in some embodiments, perform or assist in performing rendering of the source image data to enable detection and quantification of the color content.

In addition, instructions can be executed to receive source image data from various sources. As indicated above, the instructions can be executed to receive source image data from a number of apparatus types (e.g., a telecommunication apparatus, a telefaxing apparatus, a computing apparatus, a copying apparatus, and/or a scanning apparatus, among others) that can be connected to the image processing apparatus 100. For example, all of the functionalities disclosed in the present disclosure can be included in an All-In-One (AIO) system having an associated (e.g., embedded) image processing apparatus 100 that can contribute to performing the functions described below.

Figure 1B:
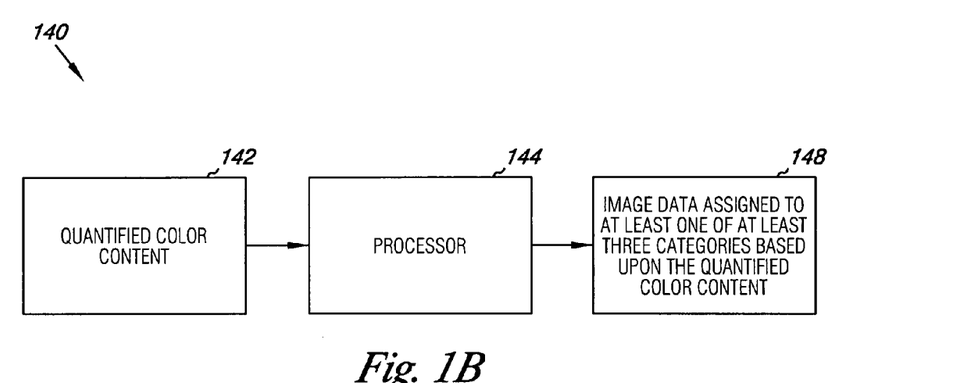
FIG. 1B illustrates an example of an image processing apparatus assigning image data based on quantified color content to at least one category according to an embodiment of the present disclosure.

FIG. 1B illustrates an example of an image processing apparatus assigning image data based on quantified color content to at least one category according to an embodiment of the present disclosure. FIG. 1B illustrates an image processing apparatus 140 that can process received image data having quantified color content 142, such as that described with regard to FIG. 1A.

Embodiments of the present disclosure can use instructions executable by a processor 144 illustrated in FIG. 1B to assign the image data to at least one of at least three categories based upon the quantified color content of the image 148. Assignment of the image data (e.g., individual pages thereof to categories based upon the quantified color content 148 can be performed by execution of instructions by the processor 144 or in combination with the processor 144.

In various embodiments, the one or more categories to which the image data can be assigned from among the at least three available categories can be selected from a monochrome category, a full color category, and a number of categories having a color content between the monochrome and the full color category. By way of example and not by way of limitation, and as described in further detail below, each page of a document having a mixture of monochrome text and color graphics can be assigned to one of at least three categories that can include monochrome, accent color, and full color.

Another example includes assigning each page to a category selected from monochrome, general office accent color, general office full color, professional accent color, and professional full color categories, as described in further detail below. An additional example includes assigning a page to a category selected from monochrome, more than one accent color category (e.g., where each accent color category's threshold differs from a neighboring accent color category's threshold), and a full color category having a threshold higher than that of the accent color categories.

Figure 1C:
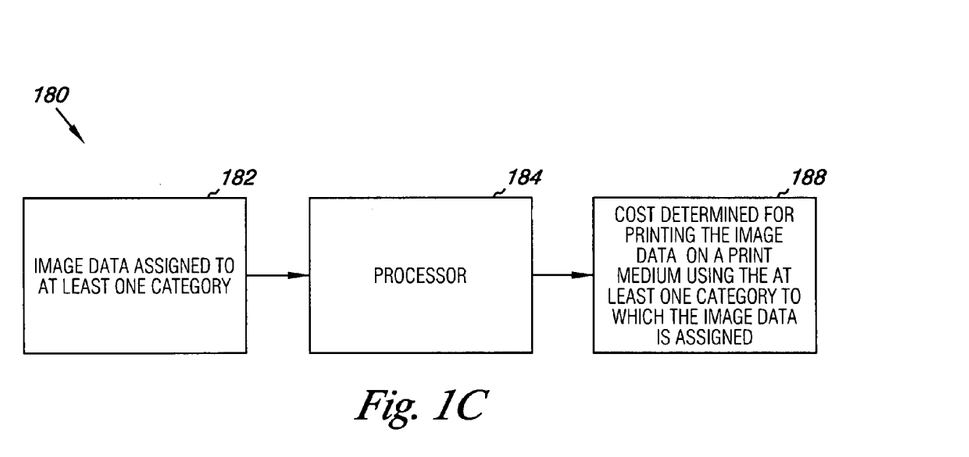
FIG. 1C illustrates an example of an image processing apparatus determining a cost for printing image data using at least one category to which the image data is assigned according to an embodiment of the present disclosure.

FIG. 1C illustrates an example of an image processing apparatus determining a cost for printing image data using at least one category to which the image data is assigned according to an embodiment of the present disclosure. FIG. 1C illustrates an image processing apparatus 180 that can process image data that has been previously assigned to at least one category based upon quantified color content 182, as shown in 148 of FIG. 1B.

Some embodiments of the present disclosure can use instructions executable by a processor 184 to determine a cost for storing a rendered image in memory and/or printing an image on a print medium (e.g., individual pages of the rendered image) using the at least one category to which the image data has been assigned 188. By way of example and not by way of limitation, the determination of a cost for printing a number of pages assigned to various categories (e.g., the categories described with regard to FIG. 1B) can be performed by execution of computer-readable instructions by the processor 184 or in combination with the processor 184.

Instructions illustrated as being executable by the processor 104 of FIG. 1A, the processor 144 of FIG. 1B, and the processor 184 of FIG. 1C can be performed using any number of processors (e.g., executed by the same processor) in an imaging system. In addition, the one or more processors can be positioned in any apparatus of the imaging system.

Figure 2A:
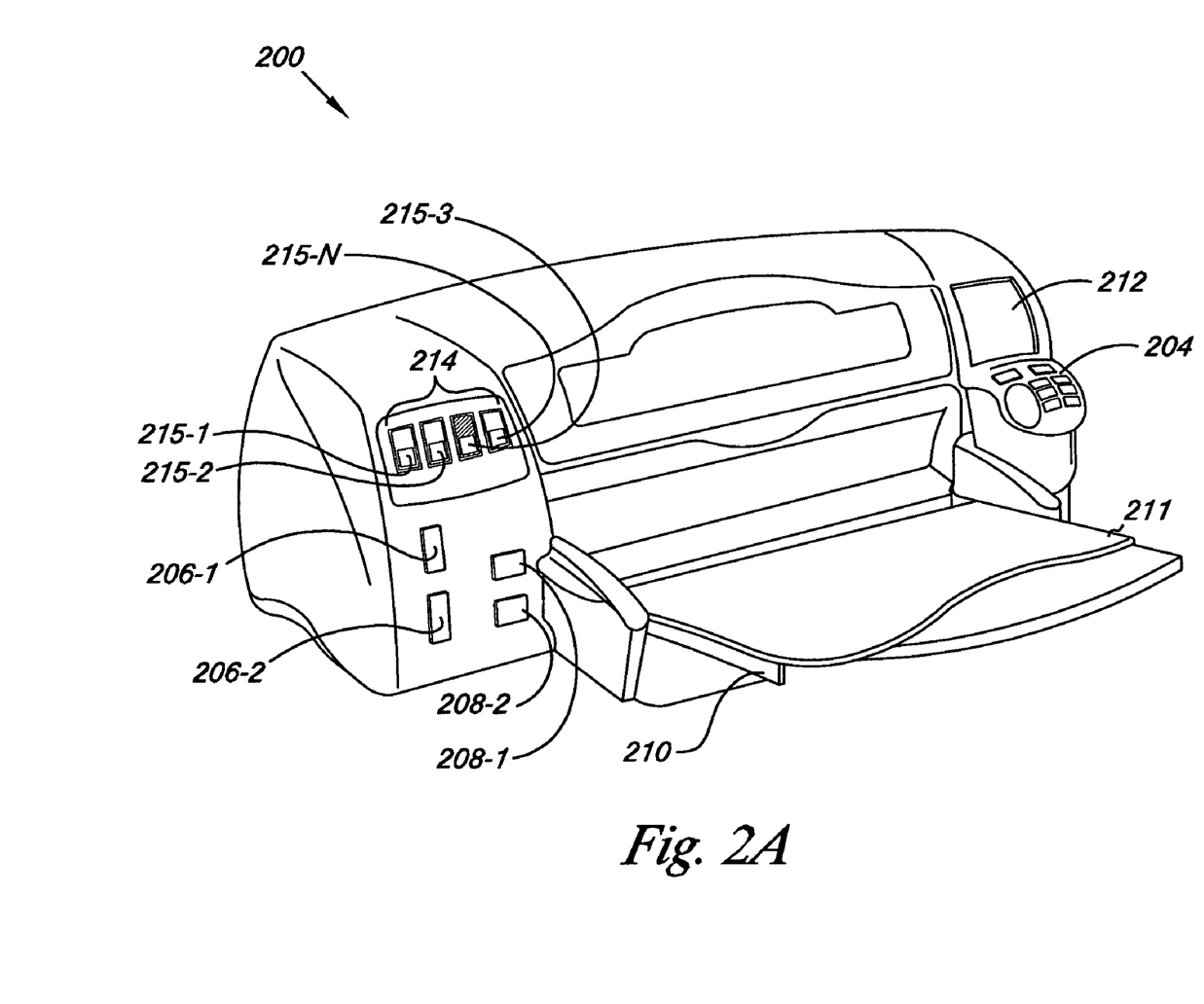
FIGS. 2A and 2B illustrate embodiments of apparatuses that are operable to implement or that can include embodiments of the present disclosure.
Figure 2B:
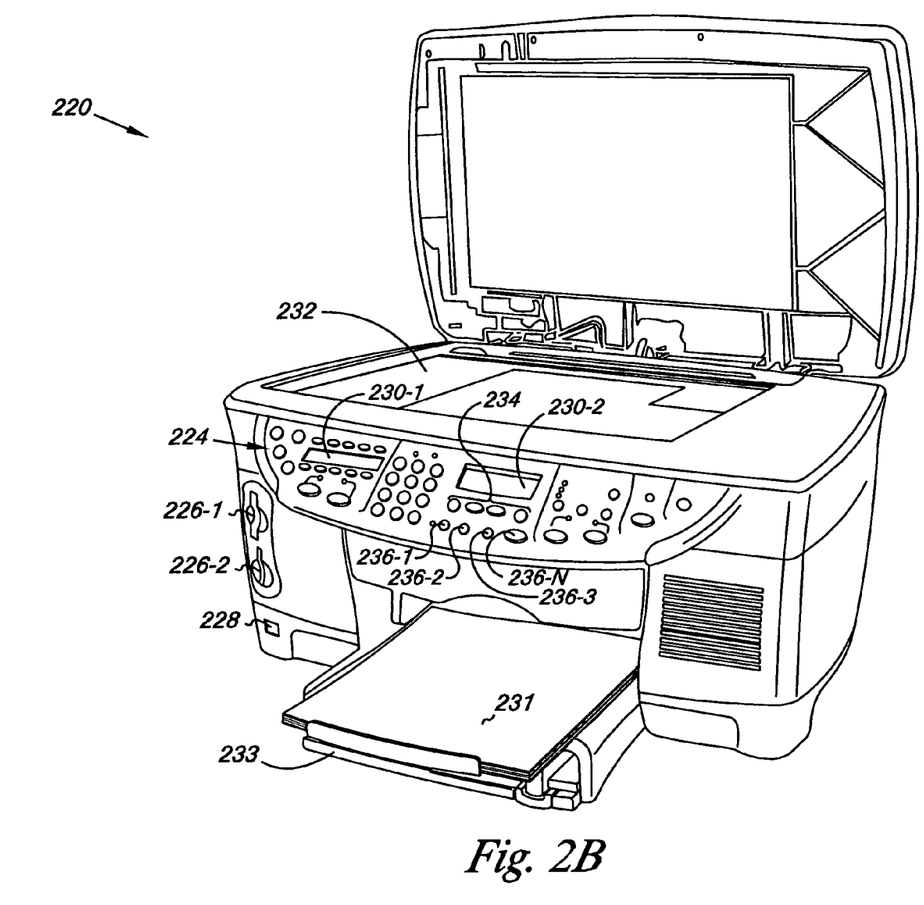

FIGS. 2A and 2B illustrate embodiments of apparatuses that are operable to implement or that can include embodiments of the present disclosure. As one of ordinary skill in the relevant art will appreciate, embodiments of the present disclosure are not limited to inclusion with or implementation on those apparatuses illustrated in FIGS. 2A and 2B.

FIG. 2A illustrates an embodiment of a printing apparatus 200 suitable for use with various embodiments of the present disclosure. The printing apparatus 200 illustrated in the embodiment of FIG. 2A can operate as a stand alone apparatus and/or can be used as a printing apparatus in an imaging system. Printing apparatuses, such as printing apparatus 200, can be operable to receive image data including color content from one or more sources and can operate on such image data to transfer the data to print media.

As shown in the embodiment of FIG. 2A, the printing apparatus 200 can include one or more data input mechanisms. As shown in the embodiment of FIG. 2A, the one or more data input mechanisms can include one or more input keys 204, such as on a control panel, one or more media slots 206-1 and 206-2 operable to receive one or removable memory, such as a flash memory card, and one or more data ports 208-1 and 208-2 operable to receive additional data input. By way of example and not by way of limitation, many printing apparatuses allow users to conveniently input a memory card from a digital camera.

As one of ordinary skill in the relevant art will appreciate, the one or more data ports 208-1 and 208-2 can include a data port operable to receive parallel or serial data connection. For example, the one or more data ports 208-1 and 208-2 can include a data port configured to receive a high speed serial cable connection, such as a universal serial bus (USB) cable.

The one or more data ports 208-1 and 208-2 can further include a data port configured to receive data in a wireless fashion, such as by using an IR or Bluetooth wireless mechanism. The printing apparatus 200 embodiment of FIG. 2A thus can be operable to obtain data of any type, from any number of sources. Data in the various embodiments can include information such as user commands, image data, and computer readable instructions or instruction sets, among others.

As shown in the embodiment of FIG. 2A, some printing apparatuses can include a display screen 212, such as an LCD, to assist in reviewing images to be printed. As further shown in the embodiment of FIG. 2A, the printing apparatus 200 can include one or more print media handling devices 210, such as a bin or tray. Print media 211, such as paper, plastic, and cardstock, among others, can be accessed by the printing apparatus 200 by having the print media 211 provided on or in a media handling device, such as media handling device 210.

FIG. 2A also includes one or more print mode indicators 214 thereon for passively and/or actively indicating a print mode setting (e.g., monochrome, accent color, and/or full color categories) selected by a user and/or a processor (e.g., processor 144 as shown in FIG. 2B). In the embodiment shown in FIG. 2A, the printing apparatus 200 has several indicators 215-1, 215-2, 215-3, . . . 215-N operable to indicate the one or more print modes of a print job being initiated.

FIG. 2A illustrates that one (i.e., indicator 215-3) of the indicators 215-1, . . . 215-N is illuminated, thereby indicating that a specific print mode has been selected. The one or more indicators 214 are also actuatable buttons operable to physically select one or more print modes.

The printing apparatus 200 can be configured to allow the print mode (e.g., monochrome, accent color, and/or full color categories) to be reviewed and confirmed before printing begins. In addition to indicating the print mode being used, the indicators 214 can indicate that a particular print mode is intended to be used and that the printing apparatus 200 is operable to receive either a confirmation of the use of that print mode, or a change to a different mode.

The one or more indicators 215-1, . . . 215-N can be selected by the user based upon review of the intended print job on the display screen 212 to affect processing of an image. The one or more indicators 215-1, . . . 215-N can be automatically selected in connection with assignment of an image and/or pages thereof to a color category (e.g., by the processor 144 shown in FIG. 1B).

FIG. 2B illustrates an embodiment of a multi-function apparatus 220, such as an AIO apparatus, suitable for use with various embodiments of the present disclosure. The AIO apparatus 220, illustrated in the embodiment of FIG. 2B, can operate as a stand alone apparatus and can further be used as a printing apparatus in an imaging system, such as the printing apparatus 200 shown in FIG. 2A.

In the embodiment of FIG. 2B, the multi-function apparatus 220 is illustrated as having one or more data input mechanisms. In the embodiment shown in FIG. 2B, the one or more data input mechanisms can include one or more input keys 224, one or more memory media slots 226-1 and 226-2, and/or one or more data ports 228.

As shown in the embodiment of FIG. 2B, the multi-function apparatus 220 can include one or more print media handling components 233 for holding one or more pieces of print media 231. And, as shown in the embodiment of FIG. 2B, the multi-function apparatus 220 can include a scanning/copying input 232, and one or more display screen user interfaces 230-1, 230-2.

The multi-function apparatus 220 embodiment of FIG. 2B thus can be operable to obtain data of any type, from any number of sources. As shown in the embodiment of FIG. 2B, the multi-function apparatus 220 can also include one or more imaging mode indicators 234 and one or more imaging selection buttons 236-1, 236-2, 236-3, . . . 236-N associated therewith.

The imaging mode selectors 236-1, . . . 236-N are shown, by way of example and not by way of limitation, as buttons that can be pressed to change or indicate the imaging mode desired. The imaging modes that can, in various embodiments, be among the imaging modes selected and/or indicated are storage and/or printing of image data in monochrome, accent color, and/or full color categories, among others related to embodiments of the present disclosure. Those skilled in the relevant art will appreciate that an indicator can be provided within a button, thereby providing a unified structure for both indicating and selecting the print mode.

Figure 2C:
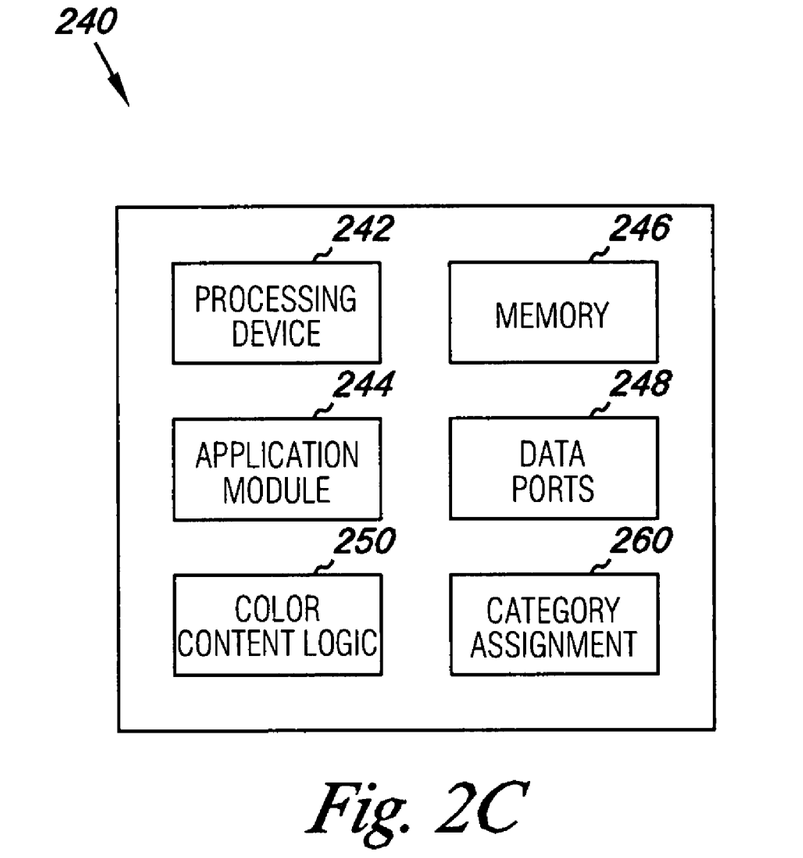
FIG. 2C illustrates a block diagram embodiment of one or more components includable in an apparatus, such as the apparatuses shown in FIGS. 2A and 2B.

FIG. 2C illustrates a block diagram embodiment of one or more components includable in an apparatus, such as the apparatuses shown in FIGS. 2A and 2B. The embodiment of FIG. 2C illustrates an apparatus 240 including one or more processing devices 242 and one or more application modules 244, suitable for operating on software and computer executable instructions.

In the embodiment of FIG. 2C, the apparatus 240 is further illustrated as having one or more resident memory mediums 246 and one or more removable or portable memory mediums and/or data ports 248 as the same have been described herein. By way of example and not by way of limitation, the one or more portable memory mediums can include selectably insertable memory mediums, such as memory cards.

The embodiment shown in FIG. 2C also can include one or more memories storing executable instructions related to image processing. Among such memories can be one or more memories 250 having instructions for color content detection logic used in processing received and rendered source image data to detect and quantify color content level(s), as described in further detail below.

Also shown in FIG. 2C are one or more memories 260 having instructions for processing assignment of image data to one or more categories based upon quantified color content level(s) determined by the color content logic 250. In some embodiments, the apparatus 240 can include instructions for processing determining a cost(s) for storage and/or printing of image data based on quantification of the image's color content (not shown).

Various embodiments of the present disclosure can be performed by software, application modules, computer executable instructions, and/or application-specific integrated circuits (ASIC) operable on the systems, apparatuses, and devices described above, or otherwise, for eventuating the functionalities of the present disclosure. As one of ordinary skill in the relevant art will appreciate upon reading and practicing the disclosure, software, application modules, computer executable instructions, and/or ASICs suitable for eventuating the functionalities of the present disclosure can be resident in a single apparatus (e.g., printing apparatus 200 and/or AIO apparatus 220) or the same can be resident in more than one apparatus across several and even many locations, such as in a distributed computing environment (e.g., an imaging system). The present disclosure is not limited either to any particular operating environment or to software written in a particular programming language.

Figure 3A:
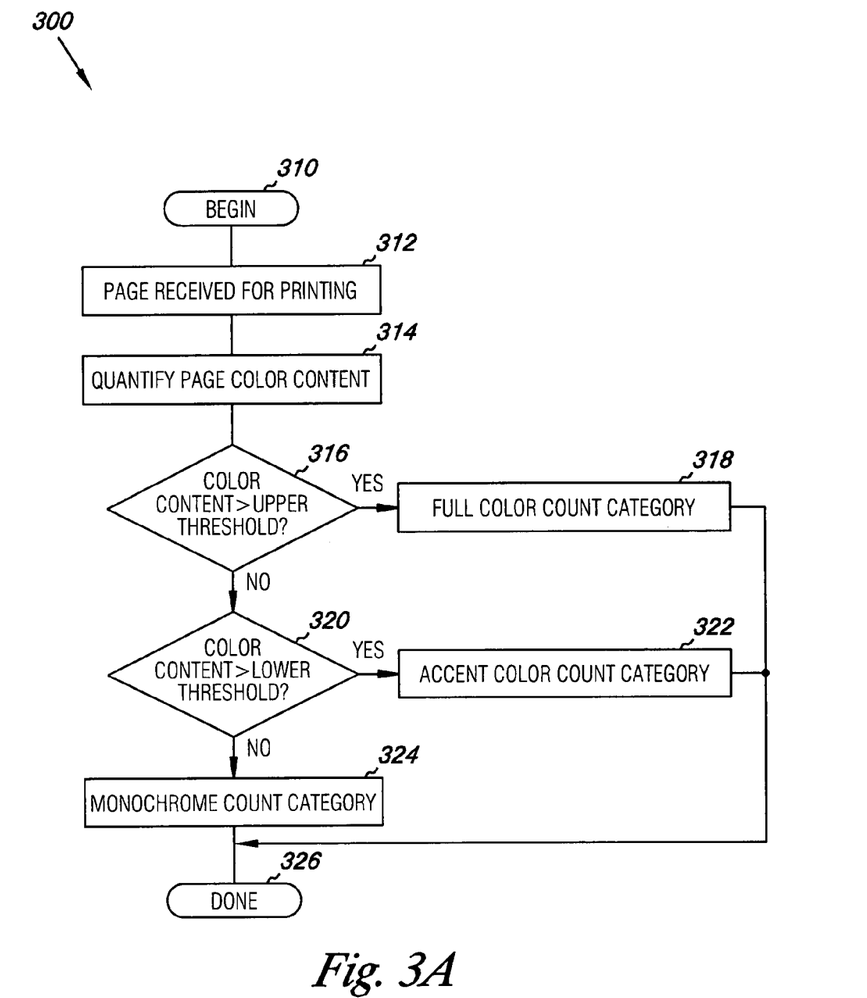
FIGS. 3A and 3B are block diagrams illustrating color content detection techniques according to embodiments of the present disclosure.
Figure 3B:
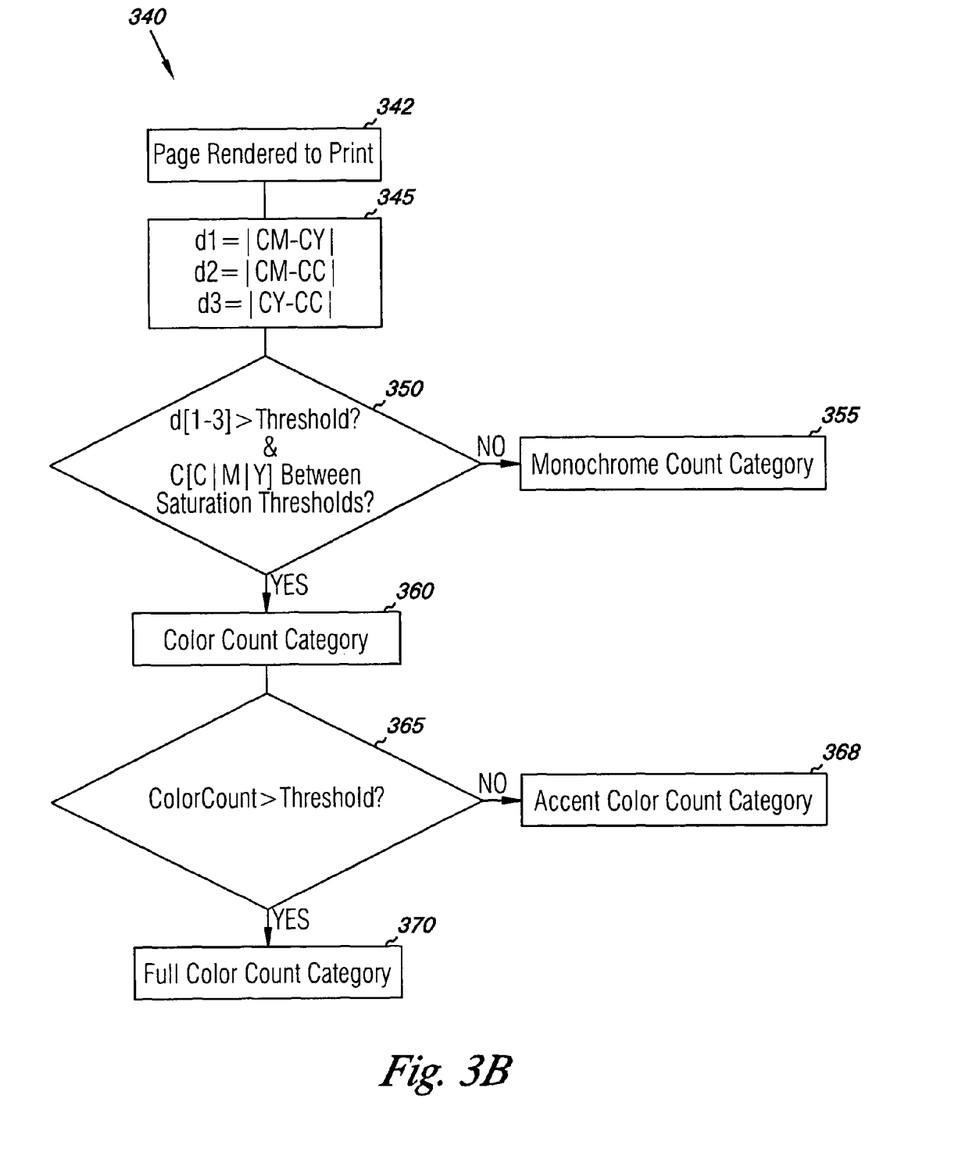

FIGS. 3A and 3B are block diagrams illustrating color content detection techniques according to embodiments of the present disclosure. As one of ordinary skill in the relevant art will appreciate, embodiments of the present disclosure are not limited to inclusion or implementation in those techniques illustrated in FIGS. 3A and 3B.

FIG. 3A is a block diagram illustrating a color content detection technique according to an embodiment of the present disclosure. The color content detection technique 300 as exemplified by the illustration shown in FIG. 3A can, in some embodiments, be utilized by an image processing apparatus receiving from a print driver a request for printing rendered image data.

For example, a host computer can send processed image data to a printer using a print driver where the image data is created and processed in the computer. As such, image data sent to the printer can be processed and the printing device can determine whether the print job contains color without uncertainty.

In addition, a host computer can send print information in the form of a Printer Description Language (PDL) digital stream (e.g., PostScript, PCL-5, PCL-6, and Adobe PDF, among others). Print job information sent as such can be analyzed without uncertainty as being either color-free or containing colors substantially free from errors due to noise because no analog-based device (e.g., a scanning apparatus) was used in creation of the image data content.

In contrast, image data acquired through use of a scanning apparatus can have a level of inherent color error (e.g., color noise) in acquired and rendered image pixels originating from the scanning process. Usage models that can introduce color noise (e.g., a scanning apparatus) can use thresholds for determining to which category to classify a print document that are different from thresholds used for image data sent by a host computer-based print driver, as described in further detail below.

The color detection technique 300 shown in FIG. 3A can begin 310, in some embodiments, with a number of pages received for printing 312. Color detection techniques of the present disclosure can, in various embodiments, be performed by receiving image data and executing instructions for processing the image data into color categories, as described below, either before or after the rendered image data has been printed on a print medium.

In various embodiments, processing the image data can include one or more of the sequence of executable actions illustrated in color detection technique 300. By way of example and not by way of limitation, any of the executable actions illustrated in color detection technique 300 can be executed by one or more processors in the printing apparatus 200 of FIG. 2A and/or the AIO apparatus 220 of FIG. 2B.

Execution of such actions can, in various embodiments, be performed using one or more of the elements illustrated in FIG. 2C. Moreover, assignment of image data to one or more color categories can be executed at various points in a color detection technique and is not limited by the sequence illustrated in the color detection technique 300 illustrated in FIG. 3A.

The color detection technique 300 illustrated in FIG. 3A executes an algorithm that can, in various embodiments, analyze received image data 312 to detect and quantify color content of the image data 314 (e.g., individual pages thereof). In some embodiments, analysis of the received image data 312 can be performed by analyzing individual pixels of rendered image data (e.g., sent by a print driver) on at least one page of the image data for color content. In such instances, analysis of individual pixels can be performed either by analysis of every pixel contained in the image data and/or page thereof or by analyzing a subset of the pixels.

By way of example and not by way of limitation, detection and quantification of color content can be performed by analyzing color content characteristics of every fourth pixel in a raster of rendered image data based on a premise that each such pixel can be representative of the neighboring three unanalyzed horizontal pixels. Further, by way of example and not by way of limitation, detection and quantification of color content can be performed by analyzing color content characteristics of pixels in every fifth raster of rendered image data based on a premise that such a pixel can be representative of the pixels in neighboring four unanalyzed rasters. In addition, by way of example and not by way of limitation, the two just-described sampling techniques can be combined such that each pixel scanned (e.g., every fourth column and every fifth row) can be representative of the neighboring 19 pixels (e.g., (4×5)−1=19).

Quantifying color content of image data and/or a page thereof 312, as illustrated in FIG. 3A, can be performed by determining a cumulative amount of at least one colorant other than a monochrome colorant used in printing an image. By way of example and not by way of limitation, a printing apparatus can use a black colorant (K) for pixels as a default monochrome colorant (e.g., for printing text characters in a document and/or "black-and-white" images) and use cyan (C), magenta (M), and yellow (Y) colorants in varying amounts in pixels contributing to colored portions of a printed image. As such, a cumulative amount of C, M, and Y colorants used in pixels of a printed image can be determined as a quantification of the color content of the image and/or a page thereof.

In some embodiments, quantifying color content of image data and/or a page thereof 312, as illustrated in FIG. 3A, can be performed by analyzing the received image data to determine an amount of color data content other than monochrome contained in the image data. For example, rendered image data can have each pixel therein or a subset thereof, as described above, analyzed for color content prior to printing the image.

In some embodiments, processing apparatuses as described with regard to FIGS. 1A-C and 2C can be used to execute analysis of rendered image data to determine an intensity, or saturation, of each color contributing to the color of a pixel. By way of example and not by way of limitation, the intensity of each color contributing to the color of a pixel can be quantified on a 0-255 scale.

In some embodiments, quantifying the color content of image data and/or a page thereof can use executable instructions for adding the saturations (e.g., 0-255) of each non-monochrome color in the rendered image data to calculate a cumulative total color content. In some embodiments, quantifying the color content of image data and/or a page thereof can use executable instructions for adding the number of pixels classified as colored pixels in the rendered image data to calculate a cumulative total color content.

To classify a pixel as a colored pixel, instructions can be executed to use at least one color content threshold value to which the quantified color content for each non-monochrome color can be compared to determine whether a pixel can be classified as a colored pixel. Executable instructions can include at least one color content threshold value to which an accumulated number of colored pixels can be compared to assign the image data and/or a page thereof to at least one of the categories (e.g., monochrome, accent color, and full color categories).

As illustrated in the color content detection technique 300 shown in FIG. 3A, the quantified color content 314 can be compared using executable instructions to an upper color content threshold 316. For example, when a page of image data has a cumulative count total of quantified saturations (e.g., on 0-255 scales) of C, M, and Y colors contributing to pixels thereof that causes the cumulative total of colored pixels to meet or exceed an upper threshold, instructions can be executed to assign the page to a full color count category 318.

A cumulative pixel count total that does not meet or exceed the upper threshold can cause instructions to execute comparison of the quantified color content 314 with a lower color content threshold 320. For example, when a page of image data has a cumulative count total of quantified saturations (e.g., on 0-255 scales) of C, M, and Y colors contributing to pixels thereof that causes the cumulative total of colored pixels to not meet or exceed an upper threshold but that meets or exceeds a lower threshold, instructions can be executed to assign the page to an accent color count category 322.

A cumulative pixel count total that is equal to or less than the lower threshold can cause instructions to be executed to assign an image and/or page thereof to a monochrome count category 324. When rendered image data has been analyzed and the image and/or pages thereof has been assigned to at least one of the available count categories based upon quantified color content, instructions can be executed to determine that the execution of the color content determination algorithm is done 326.

In some embodiments of the present disclosure, assignment of the rendered image data and/or pages thereof to one or more color count categories can be used by instructions to execute determining at least one cost for printing the image data. In such situations, image data and/or pages thereof assigned to a category between the monochrome and the full color categories can enable determination of a cost that is intermediate between a cost for printing the monochrome category and a cost for printing the full color category.

Received image data that appears substantially monochrome in the original representation (e.g., a text document) can be processed in some situations to produce rendered image data having a quantified color content 314 that exceeds the upper threshold for assignment to the full color count category 318 and/or the accent color count category 322. For example, text in a document that can be reproduced with monochrome black (K) pixels can be reproduced with pixels having high color content, such as using composite black pixels having high and substantially equal saturations of C, M, and Y.

Substitution of composite black (e.g., using C, M, and Y) for monochrome K in pixels of rendered image data can result from a number of circumstances. For example, among other reasons, ink pen(s) having K colorant can have inoperative ink jet nozzle(s) in an ink jet printer, ink pen(s) can have depleted K colorant in an ink jet printer or a toner cartridge can be depleted of K toner in a color-capable laser printer, or an image can be reproduced using composite black rather than monochrome black for cosmetic reasons.

Some embodiments of the present disclosure can include executable instructions for color content detection that determine whether composite black has been utilized in rendered image data based, for example, on high but substantially equal saturation levels of C, M, and Y in the same pixel. The instructions of such embodiments can execute assignment of the rendered image and/or pages thereof to a monochrome count category rather than one of the color count categories (e.g., the full color category). Consequently, a user of a print apparatus employing such an embodiment of the present disclosure can be charged a fee for storing and/or printing a seeming monochrome original document that reflects the user's expectations rather than a fee based upon the actual color content of the rendered image and/or the cumulative colorant utilized in printing the document on a print medium.

In various embodiments of the present disclosure, instructions executable by a processor can be executed to receive image data from a number of sources and use color content detection logic to determine a color content level for a number of pages of the image data, where the color content detection logic differs depending upon the source of the image data. In such embodiments, instructions can be executed to assign each page of the image data to one of at least three categories, as described above, where the categories can correspond to different color content levels determined by the color content detection logic.

Consistent with the color content detection technique described above with regard to FIG. 3A, image data received from a print driver can use color content detection logic that determines the color content level of a page using a cumulative total of pixels containing any non-monochrome color. As presented below with regard to FIG. 3B, image data received from a scanning device can use color content detection logic that determines the color content level of a page using a cumulative total of pixels containing enough non-monochrome color to overcome an assigned margin of error. As appreciated by one of ordinary skill in the relevant art, such a margin of error can be inherent to the scanning device due to intrinsic characteristics related to illumination and reflectivity of objects being imaged, collection of reflected light by scanning module(s), and/or processing of the reflected light, among other considerations.

FIG. 3B is a block diagram illustrating a color content detection technique according to an embodiment of the present disclosure. The color content detection technique 340 as exemplified by the illustration shown in FIG. 3B can, in some embodiments, be utilized by an image processing apparatus receiving from a separate scanning device or an embedded scanning device (e.g., in a photocopier apparatus) a request for printing rendered image data.

In some embodiments, as illustrated in the color content detection technique 340 shown in FIG. 3B, instructions can be executed to receive from a scanning device an image and/or page thereof that is rendered to print 342. In various embodiments, instructions can be executed to compensate for error in color content intensity, or saturation, in pixels coming from the scanning device. Color content detection logic can to execute determination of differences in saturation of the available colors used in pixels of a rendered image to at least partially compensate for errors and assist in determination of whether such a pixel is classified as a colored pixel.

By way of example and not by way of limitation, the box 345 illustrated in FIG. 3B shows that a first difference in color content of a pixel can be quantified by measuring a saturation count (e.g., on a 0-255 scale) of magenta color in the rendered pixel (CM), subtracting a saturation count of yellow color in the rendered pixel (CY), and recording the absolute value of the difference between CM and CY (d1). A second difference in color content of the pixel can be quantified by using CM, subtracting a saturation count of cyan color in the rendered pixel (CC), and recording the absolute value of the difference between CM and CC (d2). Similarly, a third difference in color content of the pixel can be quantified by using CY, subtracting CC, and recording the absolute value of the difference between CY and CC (d3).

As illustrated in the diamond 350 shown in FIG. 3B, instructions can be executed to use the saturation levels of the colors available for use in pixels of rendered image data to assign the image data and/or a page thereof to the various available color count categories. For example, a processor can determine whether any of the absolute values for differences in saturation of color levels d[1-3], as calculated in box 345, exceed a threshold value. The d[1-3] threshold value can be empirically adjusted based upon particular error characteristics of the scanning device supplying image data. In some situations, a d[1-3] threshold value of 12 has been used.

More generally, in various embodiments, color content detection logic can be sued by a processor to determine the color content level in the image data by classifying a pixel as a colored pixel using saturation levels of at least two colors usable for pixels of the rendered image data. In some embodiments, classifying the pixel can be performed by instructions executing comparing a difference(s) between the individual color saturation levels with a threshold value, where any of the differences exceeding the threshold value can enable classifying the pixel as a colored pixel.

As illustrated in the embodiment illustrated in the diamond 350 shown in FIG. 3B, a decision on whether to classify a pixel having a color content difference that exceeds the d[1-3] threshold as a colored pixel can depend on comparison by a processor of the individual and/or combined color saturation levels with a saturation threshold(s). In various embodiments, instructions can execute classifying a pixel by comparing the saturation levels of the at least two colors with a number of saturation threshold values, where the comparison can enable classifying the pixel as a colored pixel based upon at least one of: at least one saturation level exceeding a first saturation threshold value; a total of combined saturation levels exceeding a second saturation threshold value; at least one saturation level being less than a third saturation threshold value; and a total of combined saturation levels being less than a fourth saturation threshold value.

Portions of an image having color that is imperceptible or dimly perceptible to the human eye can nonetheless be formed using pixels with differences in saturation levels that exceed the d[1-3] saturation threshold described above. For example, a pixel having saturation levels of zero for M and C can have a saturation level of 13 (e.g., on a scale of 0-255) for Y, either as a faithful representation of the original image or as a result of scanner error, and exceed a d[1-3] threshold of 12.

Such a dimly and/or erroneously colored pixel can be classified as a colored pixel and contribute to a cumulative colored pixel count unless another condition is satisfied, as illustrated in diamond 350 shown in FIG. 3B. In some embodiments, the pixel can be classified as a colored pixel only if at least one saturation level of a usable color exceeds a first saturation threshold value, for example, a saturation threshold value of 25 for at least one color used in the pixel. In some embodiments, the pixel can be classified as a colored pixel only if a total of combined saturation levels exceeds a second saturation threshold value, for example, a saturation threshold value of 35 for all colors used in the pixel.

Portions of an image having pixels using high saturation levels of all available colors can be imperceptible or dimly perceptible to the human eye as different from monochrome (e.g., black) and nonetheless be formed using pixels with differences in saturation levels that exceed the d[1-3] saturation threshold described above. For example, a pixel having saturation levels of 255 for both M and C can have a saturation level of 242 (e.g., on a scale of 0-255) for Y, either as a faithful representation of the original image or as a result of scanner error, and exceed a d[1-3] threshold of 12.

Such a pixel can be classified as a colored pixel and contribute to a cumulative colored pixel count unless another condition is satisfied, as illustrated in diamond 350 shown in FIG. 3B. In some embodiments, the pixel can be classified as a colored pixel only if at least one saturation level is less than a third saturation threshold value, for example, a saturation threshold value of 230 for at least one color used in the pixel. In some embodiments, the pixel can be classified as a colored pixel only if a total of combined saturation levels is less than a fourth saturation threshold value, for example, a saturation threshold value of 700 for all three colors used in the pixel.

As such, in various embodiments as described above, diamond 350 illustrated in FIG. 3B shows that instructions can execute a decision to classify a pixel as a colored pixel depending on two conditions concerning pixel saturation levels being satisfied. As shown in box 350, when a difference in saturation levels exceeds the d[1-3] threshold and an individual color saturation level and/or a combined saturation level satisfies one or more of the conditions relating to the thresholds just described, instructions can be executed to classify the pixel being analyzed into a color count category 360. When both sets of threshold-dependent conditions are not satisfied, instructions can be executed to classify the pixel being analyzed into a monochrome count category 355.

The number of pixels classified into the color count category can be determined relative to the number of pixels classified into the monochrome count category and/or the total number of pixels counted. When the relative number and/or a ratio calculated therefrom does not meet or exceed a threshold, instructions can execute a decision to assign the image data and/or a page thereof to a monochrome category.

The color detection technique 340 illustrated in FIG. 3B can use executable instructions to analyze pixels classified into the color count category 360 to execute further classification of such pixels into a number of subcategories of the color count category. As shown in diamond 365, instructions can be executed to compare the number of pixels (i.e., the color count) classified into the color count category 360 with a threshold value.

When the color count is sufficient for classification into the color count category but does not meet or exceed the applicable threshold value, instructions can, in some embodiments, execute a decision to assign the image data and/or a page thereof into an accent color count category 368. However, when the color count is sufficient for classification into the color count category and does meet or exceed the applicable threshold value, the instructions can, in some embodiments, execute a decision to assign the image data and/or a page thereof into a full color count category 370.

The color content categories illustrated in the color content detection techniques shown in FIGS. 3A and 3B portray only a number of color content categories to demonstrate a decision tree to be executed by instructions consistent with the present disclosure. As shown in FIGS. 3A and 3B, image data and/or a page therein is assigned to at least one of three categories (i.e., monochrome, accent color, and full color categories). However, in various embodiments of the present disclosure, image data and/or pages thereof can be assigned to any number of additional categories based upon meeting or exceeding color count thresholds.

In some embodiments, input from a user, a manager, and/or a field service engineer can override, adjust, and/or affect executable instructions that assign image data and/or pages thereof to a particular category. For example, the user and/or manager can input instructions to store and/or print particular image data and/or pages thereof with either high (i.e., professional) or standard (i.e., general office) image/color quality.

In some embodiments, such decisions can affect resolution, for example, dots per square inch (dpi), of a reproduced image. Choice of image reproduction using general office quality either by the user, manager, and/or executable instructions can result in a lower cost for image storage and/or printing relative to professional quality.

For example, an office quality print can have a lower dpi resolution than a professional quality print, which can contribute to a lower cost for printing images and/or pages thereof. A choice between office quality and professional quality can, in various embodiments, be made for the monochrome, accent color, and/or full color categories, among any other available color categories.

In addition, an apparatus consistent with the present disclosure can allow qualified access to color content detection logic to adjust a color content threshold that determines to which of the at least three categories image data and/or each page of the image data is assigned. Qualified access can mean that a manger and/or field service engineer, for example, using a verifiable access code, can gain entry to adjust color content threshold(s), as opposed to an unqualified user. In various embodiments, gaining access to programming of the color content detection logic can be accomplished, for example, through an embedded interface of the image processing apparatus and/or a particular port (e.g., a USB port) for allowing connection of a host application (e.g., a portable laptop computer) that is not accessible to the unqualified user.

By way of example and not by way of limitation, the host application can query, control, adjust, and/or modify color content detection logic with a simple network management protocol (SNMP) using peripheral management language (PML).

Figure 4:
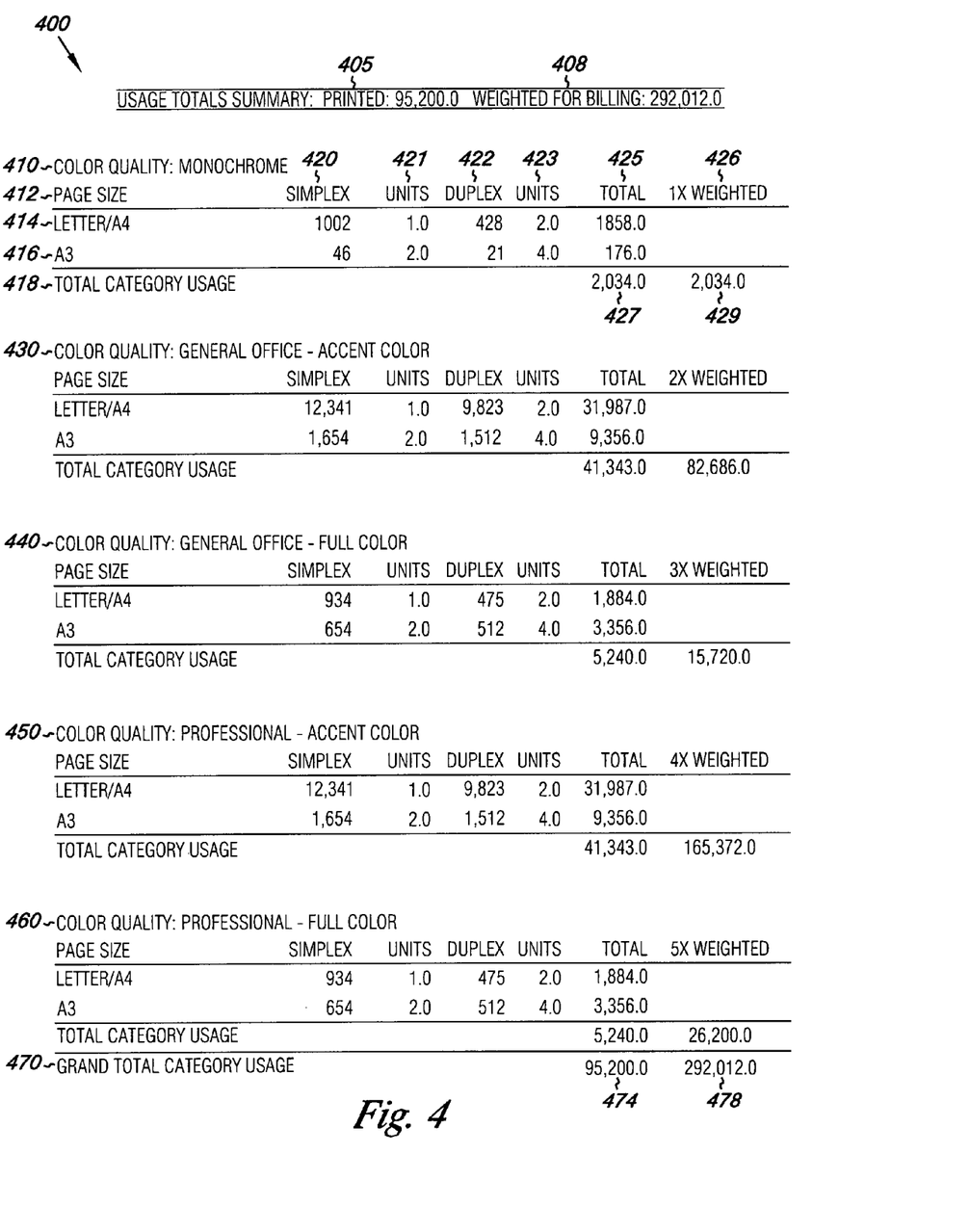
FIG. 4 illustrates an example of a usage totals summary according to an embodiment of the present disclosure.

FIG. 4 illustrates an example of a usage totals summary according to an embodiment of the present disclosure. Figure illustrates a representative example of a Usage Totals Summary (UTS) table 400 that can, in various embodiments, provide documentation of a number of pages assigned by color content detection logic and/or user input to each available color content and/or quality category, among other documented items.

In some embodiments, the UTS table 400 can document in the heading a total of pages printed 405, which can be affected by whether both sides of a page are printed, and/or the size of the page being printed, among other considerations. The heading can also document a calculation that is weighted for billing 408, which can be affected by the color content and/or quality category to which each page is assigned, as described above.

A UTS table 400 as illustrated in FIG. 4 can provide a manager of a number copier/printer apparatuses with documentation of numbers of pages, as detailed below, printed in each color content and/or quality category and relative cost thereof. Such documentation can be used by a manager, for example, for comparison of page numbers printed in accent color categories versus full color categories to determine cost savings resulting from lower weighting for billing of the accent color categories relative to the full color categories, as described below, to which the pages can otherwise be assigned in the absence of accent color categories.

The UTS table 400 illustrated in FIG. 4 shows five color quality categories, although the number of color quality categories can, in various embodiments, be unlimited so long as at least one each of the monochrome, accent color, and full color categories are represented. As such, the color quality categories illustrated in UTS table 400 include monochrome 410, general office—accent color 430, general office—full color 440, professional—accent color 450, and professional—full color 460.

A variety of types of information can be documented under each color quality category heading. As shown under the monochrome heading 410 illustrated in FIG. 4, some embodiments can include a column for page size 412 under which available page sizes for printing are listed. In the embodiment shown, a letter/A4 page size 414 is listed in which a page printed on an 8½"×11" sheet of letter-size print medium can be considered equivalent to a page printed on an international standard A4-sized print medium.

An international standard A3 page size 416, which is substantially larger than the letter/A4 page size 414, can also be listed in the column for page size 412. Letter/A4 and A3 page sizes are shown under the page size headings for each color category in UTS table 400, however, various embodiments of the present disclosure are not limited to any particular number and/or type of page sizes. At the bottom of the list of page sizes 412, some embodiments can include a heading for a total category usage 418 row in which totals for various parameters in each color quality category can be documented.

The embodiment of the UTS table 400 illustrated in FIG. 4 shows a number of columns in addition to the page size 412 column included under each color quantity heading. As a representative example, the monochrome 410 category can include a "simplex" 420 heading for a column documenting pages of image data printed on one side of the print media listed in the page size 412 column.

A "units" 421 column can be associated with the simplex 420 column where weighting parameters for each page size 412 can be documented. For example, a letter/A4 page size 414 on which image data is printed on one side can have an associated weighting unit of 1.0, whereas the larger A3 page size 416 on which image data is printed on one side can have an associated weighting unit of 2.0.

The monochrome 410 category illustrated in UTS table 400 can also include a "duplex" 422 heading for a column documenting pages of image data printed on both sides of the print media listed in the page size 412 column. Another "units" 423 column can be associated with the duplex 422 column where weighting parameters different form those shown in units column 421 can be documented.

For example, a letter/A4 page size 414 on which image data is printed on both sides can have an associated weighting unit of 2.0, whereas the larger A3 page size 416 on which image data is printed on both sides can have an associated weighting unit of 4.0. The weighting units documented in columns 421 and 423 of the monochrome 410 category, and in the units columns for all other color categories shown in UTS table 400, are arbitrarily selected, as integers that are the same for each category. However, the weighting units can, in various embodiments, be any suitable numerical values.

A printed page number, or equivalent thereof, can be documented for each page size 412 listed under each available color category. For example, in the monochrome 410 category illustrated in UTS table 400, the number of letter/A4 pages, or page equivalents, from row 414 can be calculated by multiplying the number of simplex 420 pages (i.e., 1002 pages) by the associated weighting units 421 (i.e., 1.0 units) and adding the product (i.e., 1002) to the product obtained by multiplying the number of duplex 422 pages (i.e., 428 pages) by the associated weighting units (i.e., 2.0 units) for printing on both sides of each page.

A column for a total number of pages, or equivalents thereof, can be included to document the addition of the products for each page size, thereby documenting total weighted page equivalents for each page size. For example, the total 425 column for the letter/A4 page size 414 documents the number of page equivalents obtained from multiplying the simplex and duplex page numbers by the associated weighting units (i.e., for a total of 1,858.0 page equivalents). Similarly, a number of page equivalents for the A3 page size 416 can be calculated and documented in the total 425 column ((i.e., for a total of 176.0 page equivalents).

A column for a weighting parameter for each color quality category represented in the UTS table 400 can be included to document a relative weighting for billing of each printed page, or page equivalent. For example, column 426 in the monochrome 410 category documents that each page equivalent shown in the total 425 column can be multiplied by a weighting factor of 1. Accordingly, each total page equivalent from the total 425 column can be added to yield a total documented on the total category usage 418 row (i.e., a total of 2034.0 page equivalents at 427), which can be multiplied by the weighting factor of 1 to yield a total weighted for billing on the total category usage 418 row (i.e., a weighted for billing total of 2,034.0 at 429).

Calculations consistent with those just described can be executed using executable instructions for each color quality category included in the UTS table 400. In various embodiments, combinations of the same or different weighting factors can be used for each color quality category to yield a total weighted for billing, as described above.

For example, as compared to the weighting factor of 1 for the monochrome 410 category, the general office—accent color 430 category can use a weighting factor of 2 for weighted billing, the general office—full color 440 category can use a weighting factor of 3 for weighted billing, the professional—accent color 450 category can use a weighting factor of 4 for weighted billing, and the professional—full color 460 category can use a weighting factor of 5 for weighted billing. The weighting factors documented for each color quality category shown in UTS table 400 are arbitrarily selected as integers that increase incrementally for each category. However, the weighting factors can, in various embodiments, be any suitable numerical values.

A grand total category usage 470 row can be included in a UTS table 400. In some embodiments, the grand total category usage 470 row can be placed at the bottom of the listing of color quality categories to indicate the addition of total category usage rows (e.g., the total category usage row at 418). The grand total category usage 470 row can include calculations executed by instructions documenting addition of total printed page equivalents for each color quality category (e.g., a grand total of 95,200.0 page equivalents at 474) and/or addition of weighted for billing calculations for each color quality category (e.g., a grand total of 292,012.0 at 478).

In the embodiment of UTS table 400 illustrated in FIG. 4, the grand total of page equivalents shown at 474 is the same as the documentation in the heading of the total pages printed 405 and the weighted for billing calculation at 478 is the same as the documentation of weighted for billing shown at 408. As indicated throughout the foregoing description, the number and type of entries in a UTS table is variable depending on a number of factors including color content categories, color quality categories, different page sizes, etc.

Figure 5:
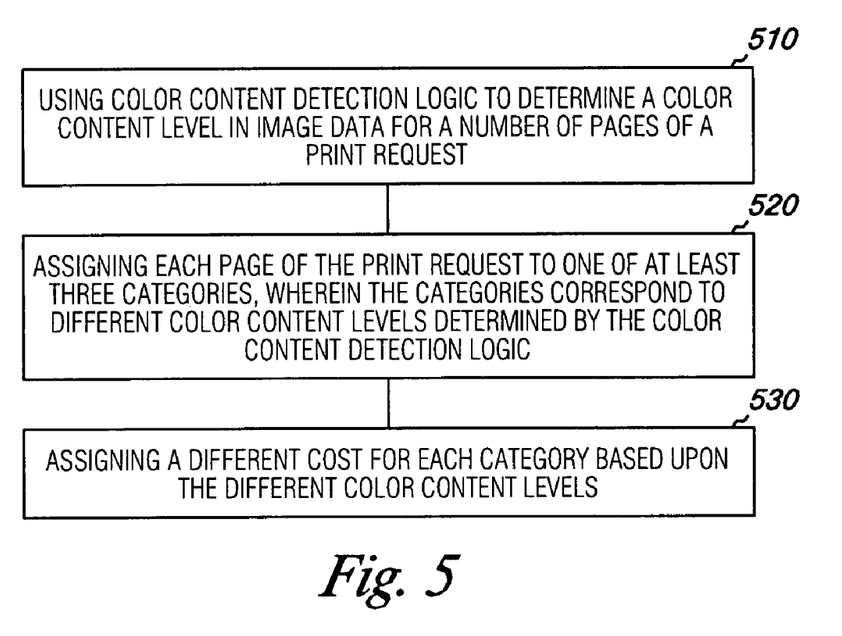
FIG. 5 is a block diagram illustrating a method of using color content detection logic according to an embodiment of the present disclosure.

FIG. 5 is a block diagram illustrating a method of using color content detection logic according to an embodiment of the present disclosure. Unless explicitly stated, the method embodiments described herein are not constrained to a particular order or sequence. Additionally, some of the described method embodiments, or elements thereof, can occur or be performed at the same, or at least substantially the same, point in time.

Again, embodiments described herein can be performed using logic, software, hardware, application modules, and ASICs, or combinations of these elements, and the like, to perform the operations described herein. Embodiments as described herein are not limited to any particular operating environment or to software written in a particular programming language.

The elements described can be resident on the systems, apparatuses, and/or devices shown herein, or otherwise. Logic suitable for performing embodiments of the present disclosure can be resident in one or more devices and/or locations. Processing devices used to execute operations described herein can include one or more individual modules that perform a number of functions, separate modules connected together, and/or independent modules.

The embodiment illustrated in FIG. 5 includes using color content detection logic to determine a color content level in image data for a number of pages of a print request, as shown in block 510. As described above, in some embodiments, determination of color content can be performed on rendered image data before or after printing of such image data on a print medium.

Block 520 of the embodiment shown in FIG. 5 includes assigning each page of the print request to one of at least three categories, where the categories correspond to different color content levels determined by the color content detection logic. Among other examples, FIGS. 3A and 3B illustrate that a number of color content detection techniques consistent with the present disclosure can be utilized by the color content detection logic to determine color content levels and FIG. 4 illustrates that pages of image data can be assigned to more than three categories, which can be based on a number of color content and a number of image quality categories.

As shown in block 530, assigning a different cost for each category can be based upon the different color content levels, as shown in FIG. 4, for example. In some embodiments, the cost can be determined for storing image data based on determination of the different color content levels in the image data and page(s) thereof. In some embodiments, calculating a cost can be determined for executing the print request on a print medium based upon assigning each page of the print request to one of the at least three categories having a cost based upon the color content levels.

In some embodiments, as described above, color content detection logic can be used to determine the color content level in the image data by classifying a subset(s) of the image data, where the subset(s) can be defined using parameters that include selection of particular rasters and pixels of rendered image data, among other parameters. For example, the color content of every fourth pixel on every fifth raster can be analyzed as a representative subset to reduce computational complexity of and/or time devoted to classifying each pixel into a color count category.

In some embodiments, color content detection logic can determine the color content level in the image data by classifying pixels as colored pixels by using saturation levels of at least two colors usable for pixels of the rendered image data. In addition or alternatively, pixels can be classified by comparing a difference between the saturation levels of the at least two colors with a threshold value, where exceeding the threshold value enables classifying the pixel as a colored pixel. In some embodiments, assigning each page of a print request to one of the-at least three color categories can be preformed by calculating a total number of colored pixels and comparing the total with thresholds for each of the color categories, where the color categories can include monochrome, accent color, and full color categories.

Depending on thresholds numbers for colored pixels for each color category, pages of documents having incidental color such as a number of colored characters (e.g., up to 2-3 lines of colored text), a number of colored lines in a graph, a small area of colored fill, a colored logo, a colored web site and/or e-mail address, etc., can be assigned to accent color categories consistent with the present disclosure rather than the full color category to which such pages can be assigned using binary decision algorithms. By way of example and not by way of limitation, a threshold number of colored pixels in a letter-size page (which can display around 3 million pixels) that can constitute a threshold between the accent color and the full color categories can be visualized as a colored area fill covering more than 0.5 square inches.

Consequently, as described above, costs for printing some documents can be reduced because billing can reflect selection from a number of levels of color content for each page rather than a selection limited to the monochrome and full color categories. In addition, the number of color content and color quality categories can be adjusted by qualified personnel, as described above, to reflect changing needs and conditions for the users of image processing apparatus(es) implementing embodiments of the present disclosure.

Other uses for embodiments described in the present disclosure can include timing of calibration and/or replacement of ink pen(s)/toner cartridge(s), or associated colorant, of an image processing apparatus based upon monitoring the number of page equivalents printed, which can be determined by printing or otherwise observing (e.g., on a monitor) a UTS page, as illustrated in FIG. 4. A reduction of monochrome page equivalent counts on the UTS page can indicate that colorant in a monochrome ink pen and/or toner cartridge is depleted and/or that error in rendered images coming from a scanning device exceeds a margin of error programmed into the color detection logic.

A reduction of monochrome and/or color page equivalent counts in embodiments that assign pages to color categories based on cumulative colorant used in printing pages can indicate depletion of colorants and the associated monochrome and/or color page equivalents can be used in determining how long such consumables last and adjusting maintenance accordingly. Further uses of a UTS page can include monitoring digital compression of images that may affect color content and image quality and durability of stored image data, among other uses.

Although specific embodiments have been illustrated and described herein, those of ordinary skill in the relevant art will appreciate that an arrangement calculated to achieve the same techniques can be substituted for the specific embodiments shown. This disclosure is intended to cover all adaptations or variations of various embodiments of the present disclosure. It is to be understood that the above description has been made in an illustrative fashion, and not a restrictive one.

Combination of the above embodiments, and other embodiments not specifically described herein, will be apparent to those of ordinary skill in the relevant art upon reviewing the above description. The scope of the various embodiments of the present disclosure includes other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the disclosed embodiments of the present disclosure need to use more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A method of image processing, comprising:
utilizing a non-transitory computer-readable medium having stored thereon computer executable instructions executable by a processor to;
receive image data from a source, wherein the image data includes a color content;
determine whether the image data includes composite black pixels;
determine a color content level of the image data based on the composite black determination, a color saturation difference between at least two colors of the color content, and color content detection logic, wherein the color content detection logic differs depending upon the source of the image data;
quantify the color content of the image data based on the color content level; and
assign the image data to at least one category based upon the quantification of the color content, wherein the at least one category is selected from a group of categories including a monochrome category, a full color category, and a number of categories between the monochrome category and the full color category.

2. The method of claim 1, wherein the method includes using the at least one category to which the image data is assigned in determining a cost for printing the image data on a print medium.

3. The method of claim 2, wherein the method includes determining at least one cost for printing image data assigned to a category between the monochrome and the full color categories that is intermediate between a cost for printing the monochrome category and a cost for printing the full color category.

4. The method of claim 1, wherein quantifying the color content includes using at least one threshold value to assign image data to at least one of the categories.

5. The method of claim 1, wherein quantifying the color content of the image data includes determining a cumulative amount of at least one colorant other than a monochrome colorant used in printing an image.

6. The method of claim 1, wherein quantifying the color content of the image data includes analyzing the received image data to determine an amount of color data content other than monochrome contained in the image data.

7. The method of claim 6, wherein analyzing the received image data includes analyzing pixels of rendered image data on at least one page of the rendered image data for color content, wherein analyzing pixels includes analyzing each pixel and analyzing a subset of the pixels.

8. A non-transitory computer-usable medium having computer-readable instructions stored thereon for executing a method comprising:
receiving image data from a source;
using color content detection logic to determine whether the image data includes composite black pixels;
using color content detection logic to determine a color content level in the image data for a number of pages of a print request based on the composite black determination and a color saturation difference between at least two colors of the color content, wherein the color content detection logic differs depending upon the source of the image data;
assigning each page of the print request to one of at least three categories, wherein the categories correspond to different color content levels determined by the color content detection logic; and
assigning a different cost for each category based upon the different color content levels.

9. The medium of claim 8, wherein the method includes calculating a cost for executing the print request based upon assigning each page of the print request to one of the at least three categories having a cost based upon the color content levels.

10. The medium of claim 8, wherein using color content detection logic to determine the color content level in the image data includes classifying a subset of the image data, wherein the subset is defined using parameters that include selection of particular rasters and pixels of rendered image data.

11. The medium of claim 8, wherein using color content detection logic to determine the color content level in the image data includes classifying a pixel as a colored pixel by using saturation levels of at least two colors usable for pixels of the rendered image data.

12. The medium of claim 11, wherein classifying the pixel includes comparing a difference between the saturation levels with a threshold value, wherein exceeding the threshold value enables classifying the pixel as a colored pixel.

13. The medium of claim 11, wherein classifying the pixel includes comparing the saturation levels of the at least two colors with a saturation threshold value, wherein the comparison enables classifying the pixel as a colored pixel based upon at least one of:
- at least one saturation level exceeding a first saturation threshold value;
- a total of combined saturation levels exceeding a second saturation threshold value;
- at least one saturation level being less than a third saturation threshold value; and
- a total of combined saturation levels being less than a fourth saturation threshold value.

14. The medium of claim 11, wherein assigning each page of the print request to one of the at least three categories includes calculating a total number of colored pixels and comparing the total with thresholds for each of the categories.

15. The medium of claim 8, wherein assigning each page to one of at least three categories includes assigning each page to a category selected from monochrome, accent color, and full color categories.

16. The medium of claim 8, wherein assigning each page to one of at least three categories includes assigning each page to a category selected from monochrome, general office accent color, general office full color, professional accent color, and professional full color categories.

17. An imaging apparatus, comprising:
- a processor;
- a memory coupled to the processor; and
- instructions storable in the memory and executable by the processor to:
  - receive image data from a number of sources;
  - use color content detection logic to determine whether the image data includes composite black pixels;
  - use color content detection logic to determine a color content level for a number of pages of the image data based on the composite black determination and a color saturation difference between at least two colors of the color content, wherein the color content detection logic differs depending upon the source of the image data; and
  - assign each page of the image data to one of at least three categories, wherein the categories correspond to different color content levels determined by the color content detection logic.

18. The imaging apparatus of claim 17, wherein image data received from a print driver uses color content detection logic that determines the color content level of a page using a cumulative total of pixels containing any non-monochrome color.

19. The imaging apparatus of claim 17, wherein image data received from a scanning device uses color content detection logic that determines the color content level of a page using a cumulative total of pixels containing enough non-monochrome color to overcome an assigned margin of error.

20. The imaging apparatus of claim 17, wherein the apparatus allows qualified access to color content detection logic to adjust a color content threshold that determines to which of the at least three categories each page of the image data is assigned.

* * * * *

UNITED STATES PATENT AND TRADEMARK OFFICE
CERTIFICATE OF CORRECTION

| | | |
|---|---|---|
| PATENT NO. | : 7,999,966 B2 | Page 1 of 1 |
| APPLICATION NO. | : 11/787792 | |
| DATED | : August 16, 2011 | |
| INVENTOR(S) | : Terry M. Fritz et al. | |

It is certified that error appears in the above-identified patent and that said Letters Patent is hereby corrected as shown below:

In column 1, line 2, below "COLOR CONTENT DETECTION" insert -- INTRODUCTION --, therefor.

Signed and Sealed this
First Day of May, 2012

David J. Kappos
*Director of the United States Patent and Trademark Office*